Patented July 25, 1933

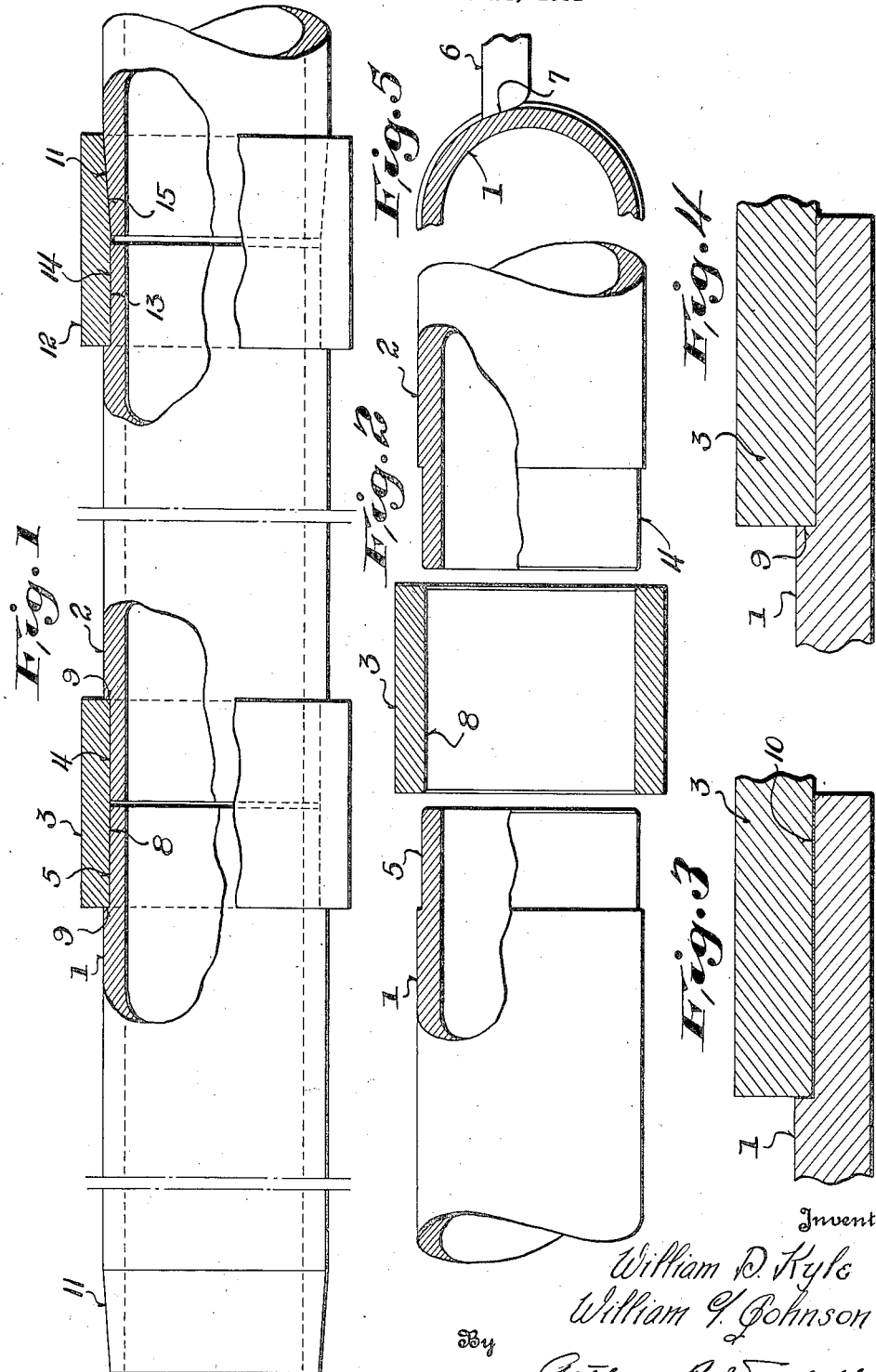

1,919,734

UNITED STATES PATENT OFFICE

WILLIAM D. KYLE AND WILLIAM G. JOHNSON, OF MILWAUKEE, WISCONSIN, ASSIGNORS TO LINE MATERIAL COMPANY, OF SOUTH MILWAUKEE, WISCONSIN

CONDUIT

Application filed January 24, 1931. Serial No. 510,972.

This invention relates to conduits and is particularly directed to a conduit made of fibrous material.

In making conduits it has been found that the difficulty of producing the conduit increases as the length of the conduit increases. For example, it is relatively simple to make a five-foot conduit, but it is many times more difficult to make an eight-foot conduit. The warping and separation of the successive layers of material deposited during the formation of the conduit becomes more and more likely to occur as the length of the conduit increases.

Further, it is extremely difficult to handle a long fibrous conduit while it is in the wet state during the process of manufacture.

This invention is designed to provide a conduit of any desired length without incurring the difficulties heretofore experienced in the manufacture of conduits.

Objects of this invention are to provide a novel form of conduit which is of a composite construction, that is to say, which is made up of a plurality of lengths permanently joined by an intermediate portion, such as a sleeve, which constitutes with the adjacent sections of the conduit a permanent and unitary structure, so that the composite conduit may be handled as a unit without inadvertent separation of the parts.

In greater detail, further objects of this invention are to provide a composite conduit formed of fibrous material and permanently joined by an intermediate sleeve also formed of fibrous material, and having a tight or forced fit with the sections of the conduit and cemented thereto, preferably by substantially waterproof cementing material.

Further objects are to provide a conduit which although formed of sections of fibrous material and an intermediate fibrous sleeve and if desired a fibrous end sleeve, may nevertheless be produced by forcing the conduit sections into the sleeve or sleeves without danger of tearing or otherwise injuring the adjacent portions of the fibrous composite conduit which are forced together during the assembly.

When it is considered that lengths of conduits shorter than standard lengths are usually discarded, and also when it is considered that this invention enables the operator to produce any length of fibrous conduit desired with the certainty that the completed unitary composite conduit will be straight, rigid and strong, so that it may be freely handled in the usual manner without requiring any especial care during its use, it becomes immediately apparent that this invention fulfills a long felt want and, in addition, provides a ready means of conserving the heretofore waste sections.

Embodiments of the invention are shown in the accompanying drawing, in which:—

Figure 1 is a view, partly broken away and partly in section, showing a composite unitary conduit with a fragment of the next adjacent unitary conduit inserted in the end sleeve.

Figure 2 shows adjacent ends of the sections forming the composite conduit unit in position about to be inserted into the intermediate sleeve.

Figure 3 is an enlarged fragmentary section at the joint between a sleeve and the adjacent end of the conduit, showing one form of construction.

Figure 4 is a corresponding view showing a further form of the construction.

Figure 5 is a fragmentary, somewhat diagrammatic view showing the manner in which the adjacent ends of the conduit may be turned.

Referring to the drawing, it will be seen that the composite conduit consists of two or more intermediate lengths of fibrous conduits, two having been shown in the drawing and indicated by the reference characters 1 and 2. These fibrous conduits are impregnated with any suitable material, such as coal tar pitch, water gas tar pitch, asphaltum tar pitch, or other suitable material. A sleeve 3 is also formed preferably of the same fibrous material and impregnated in the same manner.

The adjacent ends of the sections 1 and 2 are turned or otherwise formed to provide the cylindrical finished surfaces 4 and 5. A manner in which this operation may be performed is shown in Figure 5. A turning tool, such as a lathe tool 6, may be employed to cut or form the surfaces 4 and 5 in the conduit. It is to be noted particularly from a reference to Figure 5 that the heel 7 of the tool bears against the cut surface of the conduit and thus serves to compact or polish or otherwise smooth this surface.

The inner surface 8 of the intermediate sleeve 3 is also preferably turned in a similar manner. However, the diameter of the cylindrical end portions 4 and 5 is slightly greater than the internal diameter of the sleeve 3. The difference in diameters is such that a very tight forced fit is produced in the assembled structure.

It is preferable to slightly bevel the corners or marginal edges of the sleeve and the adjacent ends of the conduit sections, as indicated in Figure 2, as this facilitates assembly.

The impregnated fibrous conduits and the impregnated fibrous sleeve 3 when produced in the manner described above may be assembled by forcing the ends of the sections 1 and 2 into the sleeve. It is a remarkable fact that although these parts are composed of fibrous or similar material that nevertheless there is no cutting, tearing or other damage done to the ends or to the sleeve during this forcing operation. Considerable pressure is used during this operation and the parts slide together into the assembled position shown in Figure 1 without damage either to the sleeve or to the conduit sections. Although the exact theory may not be completely understood at this time, it is believed that the compacting or polishing, or in other words the very smooth finishing of these end portions, permits this forced fit without damage to the parts. The impregnated structure or body of the conduit lends itself readily to the formation of these finished surfaces.

The two sections of the conduits may be forced into the sleeve with or without first coating the inside of the sleeve and the surfaces 4 and 5 with a cementing or binding agent. This structure is shown in detail in Figure 4, which shows a fragment of the sleeve 3 and a fragment of one of the conduit sections, for instance the section 1. It is preferable to force the sections towards each other until the sleeve abuts the shoulders 9 formed in the conduit sections.

It has been discovered that a cementing material may be employed for obtaining additional security at the joint, if so desired. This cementing material is preferably substantially waterproof in its finished form. Further, the cementing material may act as a lubricant during the forcing of the ends into the sleeve.

It has been found that a solution of sodium silicate, commonly known as water glass, may be applied to the ends of the conduit sections and to the sleeve, and that this solution acts as a lubricant during the forcing of the ends of the conduit sections into the sleeve. Figure 3 is a sectional view through the intermediate sleeve and one of the conduit sections showing in an exaggerated manner the cementing material 10 as a layer between the sleeve and the adjacent portion of the conduit section.

A peculiarity of this material is that while it is in a liquid state or in solution, that a pronounced lubricating action occurs, thus materially aiding in forming the forced fit. However, after this material dries in place, it is substantially waterproof at ordinary temperature and consequently additional protection is afforded, due to the use of a material which has not only the cementing characteristics, but also the waterproofing characteristics.

It is not intended by the specific mentioning of the material, sodium silicate, to limit this invention to the use of this material, as any material having the characteristics enumerated above could obviously be employed, although sodium silicate, due to the characteristics noted above and to its relative cheapness, has been found highly satisfactory and is given as one of the possible materials that may be used.

It is preferable to bevel one end of the composite conduit section, as indicated at 11 in Figure 1, and to permanently secure an end impregnated fibrous sleeve 12, similar in composition to the sleeve 3 at the other end of the composite conduit section, as shown in Figure 1. The end sleeve 12 is provided with a cylindrical interior surface 13 which is forced over the cylindrical end surface 14 of the section 2 in a manner identically similar to that described in connection with the sleeve 3.

It is also preferable to slightly interiorly bevel the projecting portion of the sleeve 12 to provide a bevelled inner surface 15, which will receive the bevelled end of the next adjacent conduit section during the use of the conduit in actual practice. However, it is to be distinctly understood that the end sleeve 12 is permanently mounted upon the section 2, whereas it removably receives the next adjacent composite conduit section.

It will be seen that this invention supplies a long felt want as it provides a conduit of any desired length without incurring the difficulties and hazards heretofore experienced when conduits of material length have been attempted. Further, it will be seen that the composite conduit forms a unitary structure which may be handled with the same facility as the ordinary types of fibrous conduits.

It is obvious that although a composite conduit consisting of two main sections of conduit has been shown, that obviously any number of sections could be joined to make the unit of the desired length.

Although this invention has been described in considerable detail, it is to be understood that such description is intended as illustrative rather than limiting, as the invention may be variously embodied and is to be interpreted as claimed.

We claim:

1. A permanently formed unitary conduit construction comprising two lengths of fibrous conduit having juxtaposed ends each provided with a polished peripheral portion, and a fibrous sleeve having a forced fit with each of the polished peripheral portions of the juxtaposed ends.

2. A permanently formed unitary conduit construction comprising two lengths of fibrous conduit having juxtaposed ends each provided with a polished peripheral portion, a fibrous sleeve having a forced fit with each of the polished peripheral portions of the juxtaposed ends, and cementing material interposed between said ends and said sleeve.

3. A permanently formed unitary conduit construction comprising two lengths of fibrous conduit having juxtaposed ends each provided with a polished peripheral portion, a fibrous sleeve having a forced fit with each of the polished peripheral portions of the juxtaposed ends, and substantially waterproof cementing material interposed between said ends and said sleeve.

4. A unitary conduit construction comprising two lengths of fibrous conduit having juxtaposed ends, each of said juxtaposed ends having a cylindrical peripheral portion, a fibrous sleeve engaging the cylindrical portions of the juxtaposed ends and having a forced fit therewith, and cementing material interposed between said sleeve and said cylindrical portions.

5. A permanent unitary conduit construction comprising two lengths of conduit composed of fibrous impregnated material and having juxtaposed ends each provided with a finished peripheral portion, a sleeve formed of fibrous impregnated material surrounding and tightly binding the peripheral portions of said juxtaposed ends, and a substantially waterproof cementing material interposed between said sleeve and said ends.

6. A permanently formed unitary element for conduit construction comprising a length of fibrous impregnated conduit having one outer end provided with a smooth peripheral surface, a sleeve formed of fibrous impregnated material having a forced permanent fit with said smooth peripheral portion of said outer end, said conduit having its other end provided with a smooth peripheral portion, said sleeve having a projecting portion provided with an internal female portion and the peripheral portion of the last mentioned end of said conduit forming a male portion corresponding to the female portion of the sleeve, whereby a series of elements may be fitted end to end.

WILLIAM D. KYLE.
WILLIAM G. JOHNSON.